US009641996B2

(12) United States Patent
Patil et al.

(10) Patent No.: US 9,641,996 B2
(45) Date of Patent: May 2, 2017

(54) METHOD AND APPARATUS FOR GENERATING P2P GROUP FOR WI-FI DIRECT SERVICE

(71) Applicant: Samsung Electronics Co., Ltd., Gyeonggi-do (KR)

(72) Inventors: Mayuresh Madhukar Patil, Bangalore (IN); Ji-Hye Lee, Seoul (KR); Se-Hee Han, Seoul (KR); Jun-Hyung Kim, Gyeonggi-do (KR); Jong-Hyo Lee, Gyeonggi-do (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 14/420,550

(22) PCT Filed: Aug. 8, 2013

(86) PCT No.: PCT/KR2013/007175
§ 371 (c)(1),
(2) Date: Feb. 9, 2015

(87) PCT Pub. No.: WO2014/025218
PCT Pub. Date: Feb. 13, 2014

(65) Prior Publication Data
US 2015/0223046 A1 Aug. 6, 2015

(30) Foreign Application Priority Data
Aug. 8, 2012 (KR) .................. 10-2012-0086748

(51) Int. Cl.
*H04W 4/00* (2009.01)
*H04W 8/00* (2009.01)
(Continued)

(52) U.S. Cl.
CPC .......... *H04W 8/005* (2013.01); *H04L 41/0806* (2013.01); *H04L 67/1061* (2013.01);
(Continued)

(58) Field of Classification Search
CPC ..... H04W 8/005; H04W 4/08; H04W 76/023; H04W 84/12; H04W 48/14; H04L 41/0806; H04L 67/1061
See application file for complete search history.

(56) References Cited

U.S. PATENT DOCUMENTS

2008/0064376 A1  3/2008  Lee
2009/0177772 A1  7/2009  Guan
(Continued)

FOREIGN PATENT DOCUMENTS

KR  10-2012-0056533  6/2012
WO  WO 2011-062404  5/2011
WO  WO 2012-060611  5/2012

OTHER PUBLICATIONS

PCT/ISA/210 Search Report issued on PCT/KR2013/007175 (pp. 3).
(Continued)

*Primary Examiner* — Clemence Han
(74) *Attorney, Agent, or Firm* — The Farrell Law Firm, P.C.

(57) ABSTRACT

The present invention is configured such that a transmitter transmits group information and group intent information in addition to a service association frame, and constructs a topology based on the response from a receiver. The method according to one embodiment of the present invention is a method in which a first device cooperates with a second device to form a peer-to-peer (P2P) group, the method comprising the steps in which: the first device cooperates with the second device to perform a terminal discovery process and a service discovery process; a the first device transmits a request message, including connection capabilities, to the second device; the first device receives a response message to the request message from the second device; and the first device cooperates with the second device to form a (Continued)

group based on the negotiated group type information included in the response message.

12 Claims, 22 Drawing Sheets

(51) Int. Cl.
  *H04L 12/24* (2006.01)
  *H04L 29/08* (2006.01)
  *H04W 4/08* (2009.01)
  *H04W 76/02* (2009.01)
  *H04W 48/14* (2009.01)
  *H04W 84/12* (2009.01)
(52) U.S. Cl.
  CPC ........... *H04W 4/08* (2013.01); *H04W 76/023* (2013.01); *H04W 48/14* (2013.01); *H04W 84/12* (2013.01)

(56) References Cited

U.S. PATENT DOCUMENTS

| | | | |
|---|---|---|---|
| 2009/0319613 A1 | 12/2009 | Hjelm et al. | |
| 2010/0271959 A1 | 10/2010 | Qi et al. | |
| 2010/0322213 A1* | 12/2010 | Liu | H04L 67/16 370/338 |
| 2011/0085529 A1* | 4/2011 | Choi | H04W 76/023 370/338 |
| 2011/0225305 A1* | 9/2011 | Vedantham | G06F 1/3203 709/227 |
| 2012/0134349 A1 | 5/2012 | Jung et al. | |
| 2012/0224569 A1* | 9/2012 | Kubota | H04W 84/20 370/338 |
| 2012/0243524 A1 | 9/2012 | Verma et al. | |
| 2013/0185447 A1* | 7/2013 | Nagawade | H04W 8/005 709/228 |
| 2013/0227152 A1* | 8/2013 | Lee | H04W 48/16 709/227 |
| 2013/0230036 A1* | 9/2013 | Reznik | H04L 67/16 370/338 |
| 2013/0339504 A1* | 12/2013 | Montemurro | H04W 12/06 709/223 |
| 2014/0029596 A1* | 1/2014 | Li | H04W 8/005 370/338 |
| 2014/0045422 A1* | 2/2014 | Qi | H04W 76/023 455/39 |
| 2014/0091987 A1* | 4/2014 | Lee | H04L 65/00 345/2.3 |
| 2014/0314065 A1* | 10/2014 | Song | H04W 8/005 370/338 |

OTHER PUBLICATIONS

PCT/ISA/237 Written Opinion issued on PCT/KR2013/007175 (pp. 6).
European Search Report dated Mar. 3, 2016 issued in counterpart application No. 13827766.0-1854, 10 pages.

* cited by examiner

| Sender State | Receiver State | Device support | Requirements |
|---|---|---|---|
| Sender = P2P Device topology.mm | Receiver = P2P Device | x | Sender Should Be Able to Request Receiver to Generate New Group |
| | Receiver = P2P GO | Concurrent | - Sender Should Be Able to Request Receiver to Generate New Group<br>- Sender Should Be Able to Request Join in Group to Which Receiver Belongs<br>- Sender Should Be Able to Request Receiver to Terminate Existing Group and Generate New Group |
| | | Non Concurrent | : Receiver Should Be Able to Receive Request Message from Sender, Regardless of Existing P2P Session<br>: Receiver Should Be Able to Notify Intention of Processing Request after Completion of Processing, if Receiver is Processing Existing P2P Service Session<br>: Receiver Should Be Able to Autonomously Continue Existing Request Processing Upon Completion of Processing of Existing Session |
| | Receiver = GC | Concurrent | - Sender Should Be Able to Request Receiver to Generate New Group<br>- Sender Should Be Able to Request Join in Group to Which Receiver Belongs<br>- Sender Should Be Able to Request Receiver to Terminate Existing Group and Generate New Group |
| | | Non Concurrent | : Receiver Should Be Able to Receive Request Message from Sender, Regardless of Existing P2P Session<br>: Receiver Should Be Able to Notify Intention of Processing Request after Completion of Processing, if Receiver is Processing Existing P2P Service Session<br>: Receiver Should Be Able to Autonomously Continue Existing Request Processing Upon Completion of Processing of Existing Session |

METHOD AND APPARATUS FOR GENERATING P2P GROUP FOR WI-FI DIRECT SERVICE

PRIORITY

This application is a National Phase Entry of PCT International Application No. PCT/KR2013/007175, which was filed Aug. 8, 2013, and claims priority to a Korean Patent Application filed on Aug. 8, 2012 in the Korean Intellectual Property Office and assigned Serial No. 10-2012-0086748, the entire contents of which are incorporated herein by reference.

TECHNICAL FIELD

The present disclosure relates to a Wireless Fidelity (Wi-Fi) technology, and more particularly, to a method and apparatus for generating a Peer-to-Peer (P2P) group.

BACKGROUND ART

A current Wi-Fi technology (for example, an IEEE 802.11 standard technology) allows a user to discover an Access Point (AP) and/or other Wi-Fi device(s). Once the devices are discovered, the user connects to an arbitrary AP and communicates with other devices through the connected AP.

The Wi-Fi Direct (for example, a Wi-Fi P2P standard technology) allows the user to connect to an arbitrary Wi-Fi device without a user's request for connection to the AP. The Wi-Fi Direct enables different P2P services (for example, file sharing, media sharing, and the like).

A device desiring to perform Wi-Fi P2P communication needs to form a P2P group with other devices.

In addition, when using the Wi-Fi Direct service, the user desires to use the service at all times, regardless of a particular situation. However, depending on a particular state, some devices may not provide the service.

Therefore, a need exists for a method for forming a P2P group, taking the foregoing problems into account.

DISCLOSURE

Technical Problem

The present disclosure provides a method and apparatus for dynamically generating a group, taking a network state and/or capability into account.

The present disclosure also provides a method and apparatus for dynamically generating a group based on a service state.

Technical Solution

In accordance with an aspect of the present disclosure, there is provided a method for forming a Peer-to-Peer (P2P) group with a second device by a first device, the method including performing, by the first device, a terminal discovery process and a service discovery process with the second device, sending a request message including connection capabilities to the second device, receiving a response message to the request message from the second device, and forming a group with the second device based on negotiated group type information included in the response message.

In accordance with another aspect of the present disclosure, there is provided an apparatus for forming a P2P group with a second device by a first device, the apparatus including a controller configured to control performing a terminal discovery process and a service discovery process with the second device, sending a request message including connection capabilities to the second device, receiving a response message to the request message from the second device, and forming a group with the second device based on negotiated group type information included in the response message.

In accordance with another aspect of the present disclosure, there is provided a method for forming a P2P group with a first device by a second device, the method including performing, by the second device, a terminal discovery process and a service discovery process with the first device, receiving a request message including connection capabilities from the first device, checking the connection capabilities included in the request message and determining whether to form a group based on the connection capabilities, generating negotiated group type information and sending a response message comprising the generated negotiated group type information, if determining to form the group based on the connection capabilities, and forming the group with the first device based on group formation information included in the response message.

In accordance with another aspect of the present disclosure, there is provided an apparatus for forming a P2P group with a first device by a second device, the apparatus including a controller configured to control performing, by the second device, a terminal discovery process and a service discovery process with the first device, receiving a request message including connection capabilities from the first device, checking the connection capabilities included in the request message and determining whether to form a group based on the connection capabilities, generating negotiated group type information and sending a response message comprising the generated negotiated group type information, if determining to form the group based on the connection capabilities, and forming the group with the first device based on group formation information included in the response message.

Advantageous Effects

The present disclosure may dynamically generate a group, taking a network state and/or capability into account.

The present disclosure may dynamically generate a group based on a service state.

The present disclosure may autonomously generate a group and provide a service after termination of an existing session, even for a device that does not support a concurrent mode.

DESCRIPTION OF DRAWINGS

FIGS. 3 through 6 illustrate tables showing P2P group generating conditions according to an embodiment of the present disclosure;

MODE FOR CARRYING OUT THE INVENTION

Hereinafter, exemplary embodiments of the present disclosure will be described in detail with reference to the accompanying drawings. While the disclosure has been described with reference to specific details, such as detailed components, these are only examples to facilitate the overall understanding of the disclosure, and thus the disclosure is not limited thereto. It will be understood by those skilled in the art, that various modifications and alternations may be made.

A device is an entity for performing Peer-to-Peer (P2P) communication with another device, and may also be referred to as a P2P device, a User Equipment (UE), a Mobile Station (MS), a Mobile Equipment (ME), a terminal, a transmitter, a receiver, a Provision Discovery (PD) requestor, a PD response, or the like.

Figure 1:
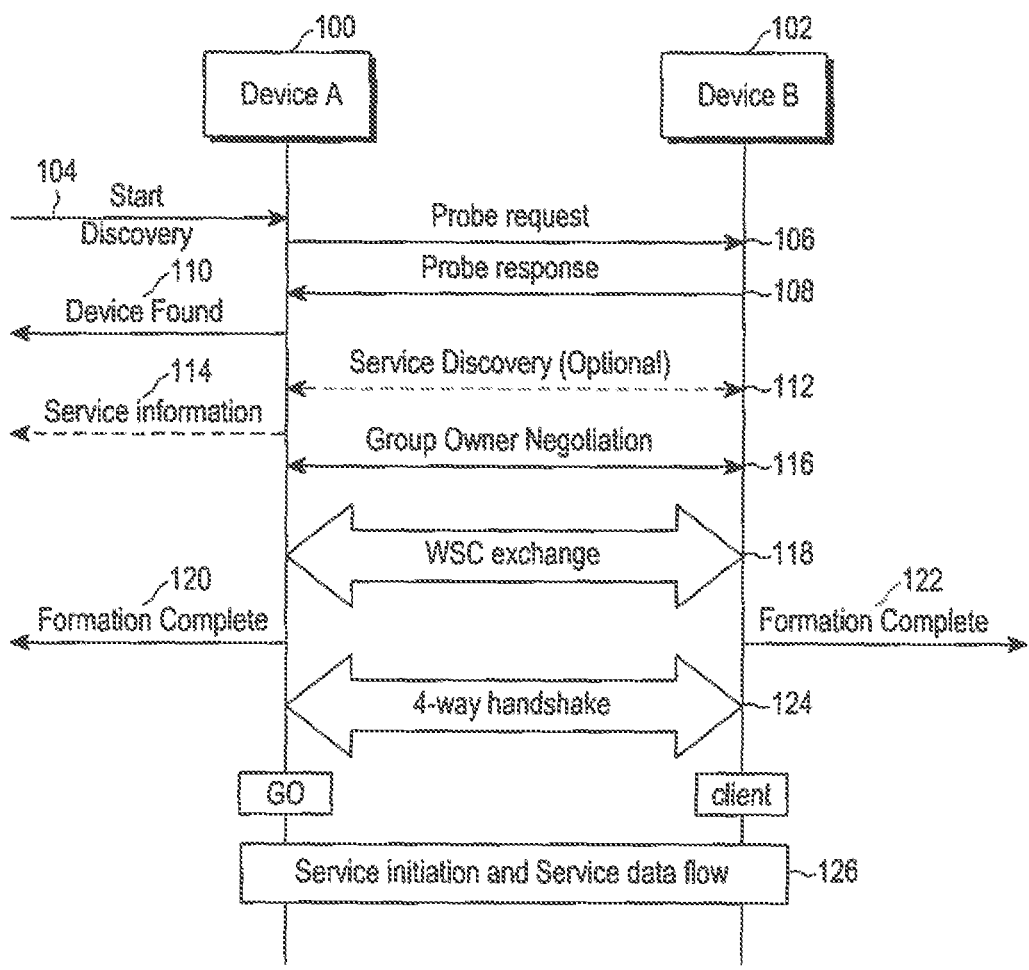
FIG. 1 illustrates a discovery and P2P group formation process between devices.

FIG. 1 illustrates a discovery and P2P group formation process between devices.

A device A 100 desiring to start discovery in operation 104 sends a probe request to a device B 102 in operation 106. The device A 100 receives a probe response 108 transmitted in response to the probe request, such that the device A 100 discovers the device B 102 in operation 110.

Optionally, the device A 100 and the device B 102 may further perform an operation 112 of exchanging a signal for service discovery. By doing so, the device A 100 may (provide) receive (or share) service information (to) from (or with) the device B 102 in operation 114. The service information may be, for example, In-use, No-use, or the like. That is, the service information may be obtained by sending a query/response regarding a service provided by a device through the service discovery process.

The device A 100 and the device B 102, which exchange the probe signals 106 and 108, perform group owner negotiation in operation 116. A network configuration state of a neighboring device may include a P2P device, a P2P Group Owner (GO), and a P2P client. In an example of FIG. 1, the device A 100 serves as the GO, and the device B 102 serves as the P2P client.

The device A 100 and the device B 102 perform Wi-Fi Simple Config (WSC) Exchange in operation 118 to complete connection formation in operations 120 and 122. The device A 100 and the device B 102 perform 4-way handshake in operation 124. The device A 100 and the device B 102 generate a temporary key to be used for connection through a handshake based on a credential for secure channel formation, and complete connection.

In this way, the device A 100 and the device B 102 form a new P2P group. Service initiation and service data flow transmission between the devices are performed in operation 126.

Figure 2:
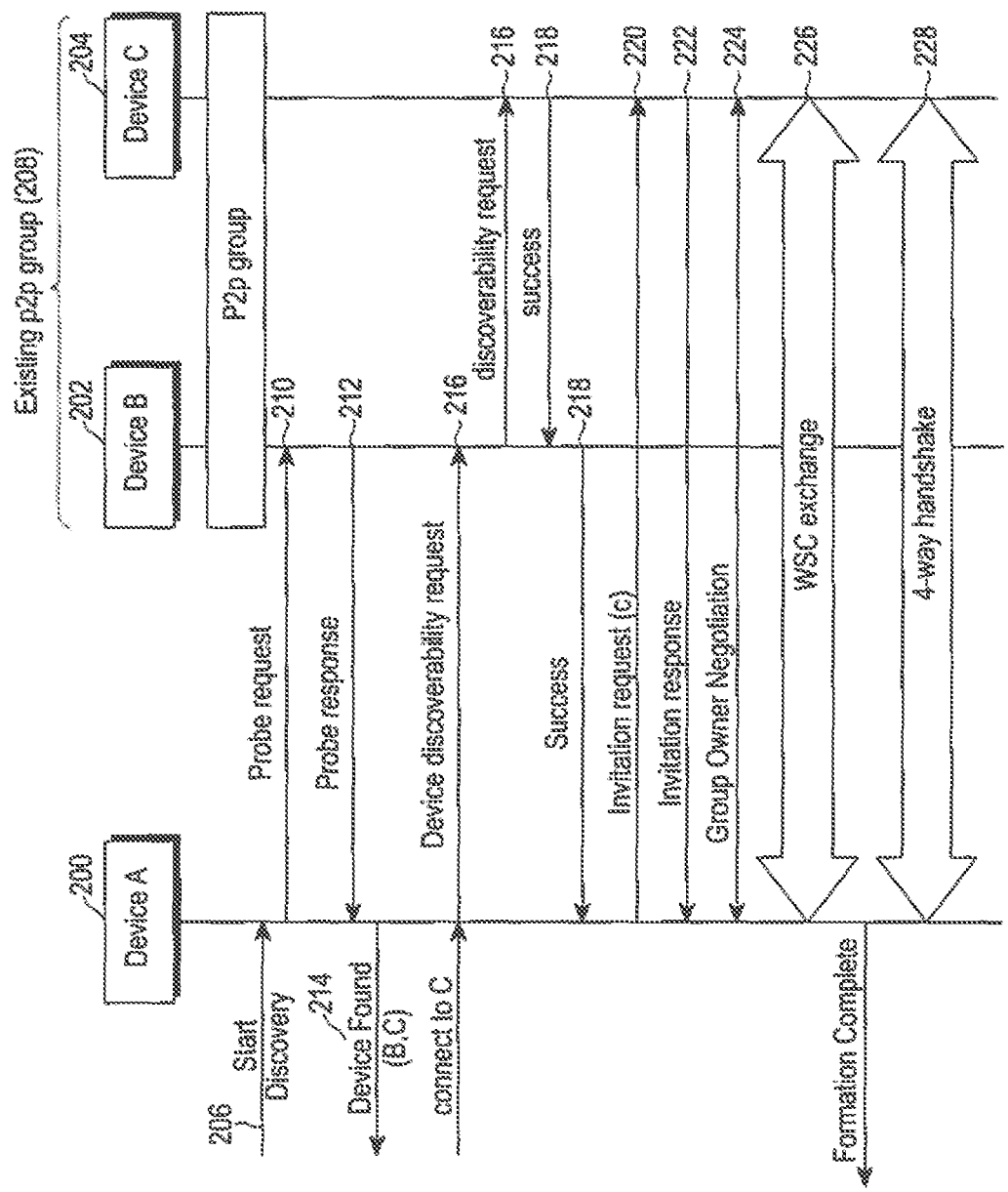
FIG. 2 illustrates a discovery and P2P group formation process with a device belonging to an existing group.

One P2P group may include one device, which is a GO serving as an AP. One device may discover another device that has already joined an existing P2P group. The device may attempt connection by sending a discoverability request and an invitation request to the another device. With reference to FIG. 2, a detailed description will be made of a process of forming a new P2P group with another device having joined an existing P2P group.

FIG. 2 illustrates a discovery and P2P group formation process with a device belonging to an existing group.

It is assumed that a device B 202 and a device C 204 have already formed an existing P2P group 208 and a device A 200 desires connection with the device C 204.

The device A 200 starting discovery in operation 206 sends a probe request to the device B 202, which is a GO of an existing P2P group 208, in operation 210, and receives a probe response from the device B 202 in operation 212, thus discovering the device B 202 and the device C 204 in operation 214.

The device A 200 desiring connection to the device C 204 may use a discoverability mechanism and an invitation mechanism.

More specifically, the discoverability mechanism may include an operation 216 in which the device A 200 sends a discoverability request (or a device discoverability request) to the device C 204 through the device B 202 and an operation 218 in which the device A 200 receives a response to the discoverability request from the device C 204.

The invitation mechanism may include an operation 220 in which the device A 200 sends an invitation request for requesting a join in a new P2P group to the device C 204 and an operation 220 in which the device A 200 receives an invitation response from the device C 204. Thus, a message of the invitation request 220 includes information for specifying the device C 204 as a destination (for example, a device ID c).

Once executing the discoverability mechanism and the invitation mechanism in this way, the device A 200 forms a new P2P group by performing GO negotiation in operation 224, WSC exchange in operation 226, and 4-way handshake in operation 228 with the device C 204.

The device C 204 releases existing group connection and generates a group with the device A 200, or if having a capability of maintaining two groups at the same time, generates a group with the device A 200 while maintaining the existing group.

Subsequent operations are the same as general P2P connection creation.

FIGS. 3 through 6 illustrate P2P group generation conditions according to an exemplary embodiment of the present disclosure.

Figure 4:
Figure 5:
Figure 6:
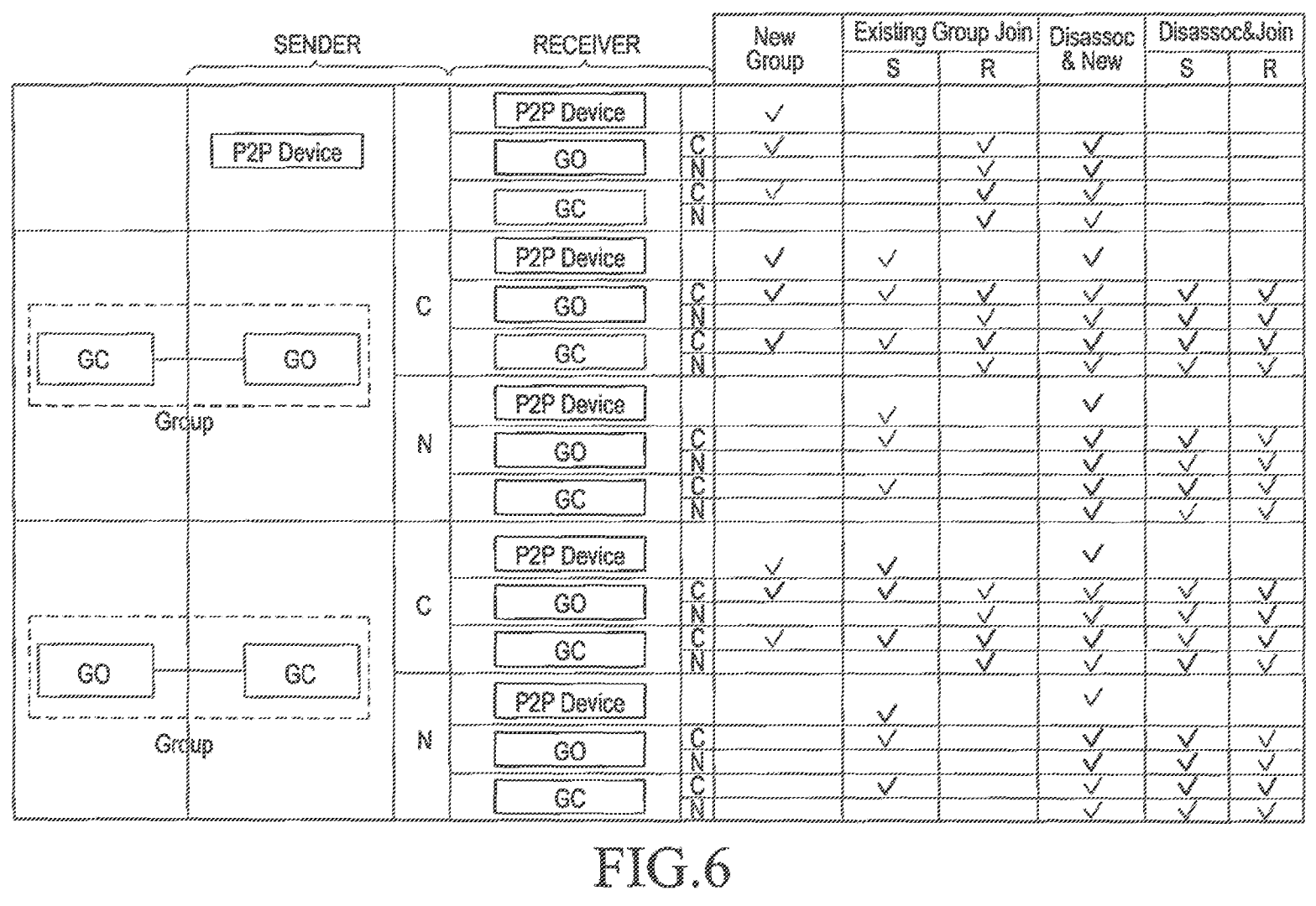

FIGS. 3 through 6 illustrate 1:1 group generation conditions. More specifically, FIG. 3 illustrates 1:1 group generation conditions when a sender is a P2P device; FIG. 4 illustrates 1:1 group generation conditions when a sender is a P2P GO; FIG. 5 illustrates 1:1 group generation conditions when a sender is a P2P client or Group Client (GC); and FIG. 6 illustrates possible cases (1:1 groups) and topology group generation according to FIGS. 3 through 5.

FIGS. 3 through 6 illustrate conditions for generating a group based on a sender state, a receiver state, and whether concurrent connection among devices is possible for each device.

The group generation conditions illustrated in FIGS. 3 through 6 are described in detail in FIGS. 3 through 6, and thus a description thereof will not be provided herein. Once a group is generated according to the group generation conditions, an optimal P2P group may be generated according to at least one of a network state, a device capability, and a service state.

For a device that does not support a concurrent mode, a group may be autonomously generated to provide a service after termination of an existing session.

Figure 7:
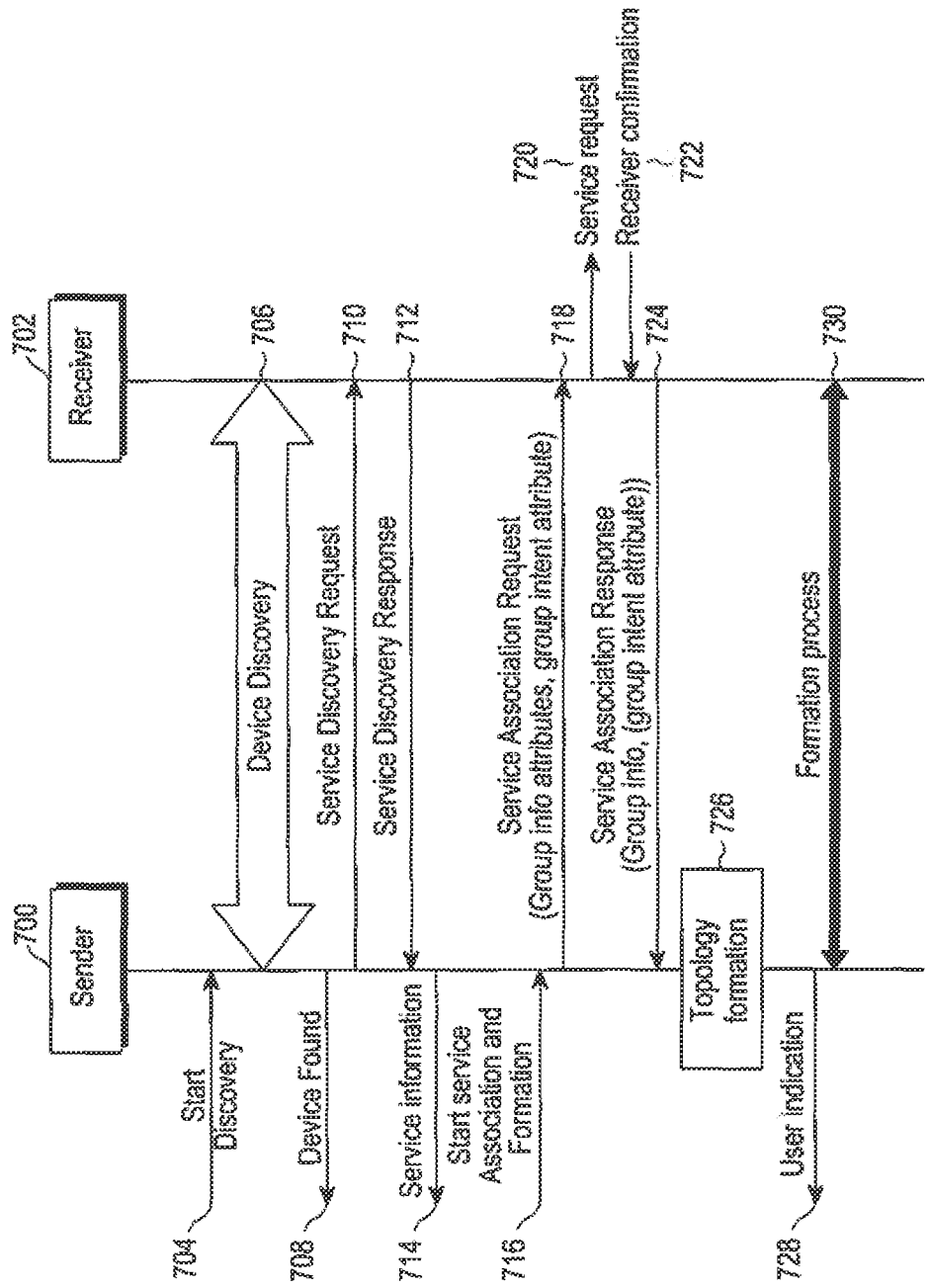
FIG. 7 illustrates a P2P group formation process according to an embodiment of the present disclosure.

FIG. 7 illustrates a P2P group formation process according to an exemplary embodiment of the present disclosure.

A sender 700 desiring to start discovery in operation 704 sends a probe request to a receiver 702 and receives a probe response to the probe request, such that the sender 700 discovers the receiver 702 in operation 708, thus completing a device discovery process in operation 706.

The sender 700 sends a service discovery request to the receiver 702 in operation 710 and receives a service discovery response to the service discovery request, thus completing a service discovery process.

In this way, the sender 700 may (provide) receive (or share) service information (to) from (or with) the receiver 702 in operation 714. The service information may be, for example, In-use, No-use, or the like. That is, the service information may be obtained by sending a query/response regarding a service provided by a device through the service discovery process.

Through the device discovery process and the service discovery process, at least one terminal desiring to transmit a file may be determined.

A user using the sender 700 instructs the sender 700 to start service association and formation in operation 716. The sender 700 delivers a Service Association request including Group information and/or Group Intent information to the receiver 702 in operation 718, and receives a Service Association response to the request. The receiver 702 having received the Service Association request requests a service to confirm whether the user using the receiver 702 has an intention of receiving the file, in operation 720. In an executable example, the Group information and the Group Intention information may be transmitted through a Service Association Frame. In a further executable example, the Group information and the Group Intent information may be transmitted through a Group Negotiation message. The Group information may indicate a group identifier (ID) for a group to be generated. The Group Intent information may be used to indicate the same meaning as connection capabilities. The Group information and/or the Group Intent information (or the connection capabilities) may be included in the Service Association request message sent from the sender to the receiver, or may be included in a P2P provision discovery request message sent from the sender to the receiver. The Service Association request message and/or the P2P Provision Discovery Request message attribute information of a file to be sent, for example, the number of files, a total size of the files, and file names, and the like, in addition to the Group Intent information and/or the connection capabilities.

Once making a confirmation of whether the user using the receiver 702 has the intention of receiving a file through the receiver 702 in operation 722 after operation 720, the receiver 702 delivers the Service Association response to the sender 700. The receiver 702 having received the Group Intent information may determine a group type based on parameter values described below, may send a response message, or may respond with a Group Intent value that is different from that sent from the sender. In a further executable example, the Service Association response may include the Group information without including the Group Intent value, as in operation 724.

The sender 700 forms a group based on the Service Association response received from the receiver 702 in operation 726 and notifies a user using the sender 700 of the formation of the group in operation 728. Thereafter, the sender 700 performs a group formation process with the receiver 702 in operation 730. The group formation according to the present disclosure may be one-to-one group formation or one-to-multi topology. According to an embodiment of the present disclosure, a case in which a group is formed in operations 726 and 730 is illustrated in FIG. 6. The Group Intent information may include, for example, New group, existing group join, Disassoc & New (group), Disassoc & join (group), and so forth. In FIG. 6, S represents a sender, R represents a receiver, C represents Concurrent Mode, and N represents Non-Concurrent Mode.

Even when the receiver 702 belongs to an existing group, the group formation method as illustrated in FIG. 7 may be applied.

The group formation will be described in more detail with reference to Table 1 provided below.

The Group Intent information carries information indicating a group of which type is to be generated. The Group Intent information is determined by at least one of the following parameters. The negotiated Group Intent information to be described below is also determined by at least one of the following parameters:

Intra BSS distribution value of the sender/receiver group;
Group Limit information (no of client limited in a group); and
Sender/receiver device session type or media session type of ongoing session.

An example of the Group Intent information is as follows:
New Group: requesting to establish the new group;
Join Group: requesting to join the group of SENDER or RECEIVER, group identified by the Group Info;
Disassoc & New Group: User is busy with current session, and will form a new group once it is finished; and
Disassoc & Join Group: User is busy with current session, and will join the group once it is finished.

A sender transmits a Group Intent value to a receiver (through a Service Association Request as an example of a possible embodiment, or by defining a separate Action Frame or using a Group Negotiation message).

The receiver having received the Group Intent value also may determine a group formation type based on the parameter value, send a response message, and respond with a Group Intent value that is different from that sent by the sender.

The sender generates a group based on the negotiated Group Intent information.

Table 1 provided below shows an example of information included in the Service Association request message sent in operation 718.

TABLE 1

| Sender state | Group Info | Group Information attribute (Group intent information) | Meaning |
| --- | --- | --- | --- |
| P2P device | Identify the new group Information | "newgroup" | start the new group |
| P2P device | Identify the receiver group | "Join" | To join the receiver group |
| P2P Client | Identify the receiver group | "Join" | To join the receiver group |
| P2P Client | Identify the new group | "newgroup" | Request to start new group |
| P2P Client | Identify the sender group | "Join" | Request to join a sender group |
| GO | Identify the new group | "new group" | start the new group |
| GO | Identify the sender group | "Join" | Request to join new group |
| GO | Identify the receiver group | "Join" | Join receiver group |

In operation 716, the group may be generated based on Table 2 provided below. However, the generation is not limited to this rule.

TABLE 2

| PD Responder | PD Requestor | | |
|---|---|---|---|
| | New | Client | Go |
| New | GO Negotiation | Requestor will autonomously start a P2P group by becoming a P2P GO | Responder will join Requestor's group |
| Client | Requestor will autonomously start a P2P group by becoming a P2P GO | Fail | Responder will join Requestor's group |
| GO | Requestor will join Responder's group | Requestor will join Responder's group | Fail |

In Table 2, a Provision recovery Requestor may mean a sender and a PD Responder may mean a receiver.

Referring to Table 2, if the PD Requestor is "New" and the PD Responder is "New", the PD Requestor and the PD Responder perform GO negotiation. If the PD Requestor is "Client" and the PD Responder is "New", the PD Requestor is a P2P GO, thus autonomously starting a P2P group. If the PD Requestor is "GO" and the PD Responder is "New", the PD Responder joins a group of the PD Requestor.

Referring to Table 1, if the PD Requestor is "New" and the PD Responder is "Client", the PD Requestor is a P2P Go, thus autonomously starting a P2P group. If the PD Requestor is "Client" and the PD Responder is "Client", the PD Requestor and the PD Responder fail in GO negotiation. If the PD Requestor is "GO" and the PD Responder is "Client", the PD responder joins a group of the PD Requestor.

Referring to Table 1, if the PD Requestor is "New" and the PD Responder is "GO", the PD Requestor joins a group of the PD Responder. If the PD Requestor is "Client" and the PD Responder is "GO", the PD Requestor joins the group of the PD Responder. If the PD Requestor is "GO" and the PD Responder is "GO", the PD Requestor and the PD Responder fail in GO negotiation.

The above-described method according to an embodiment of the present disclosure may generate an optimal P2P group based on a network state, device capability, and a service state. FIG. 6 shows the result of generating the optimal P2P group.

The present disclosure may also autonomously generate a group to provide a service upon termination of an existing session even for a device that does not support the concurrent mode.

FIGS. 8 through 21 are operation flowcharts for group generation according to another embodiment of the present disclosure.

FIGS. 8 through 21 illustrate modified cases of FIG. 7, in which a group is formed in one of multiple cases illustrated in FIG. 6.

Figure 8:
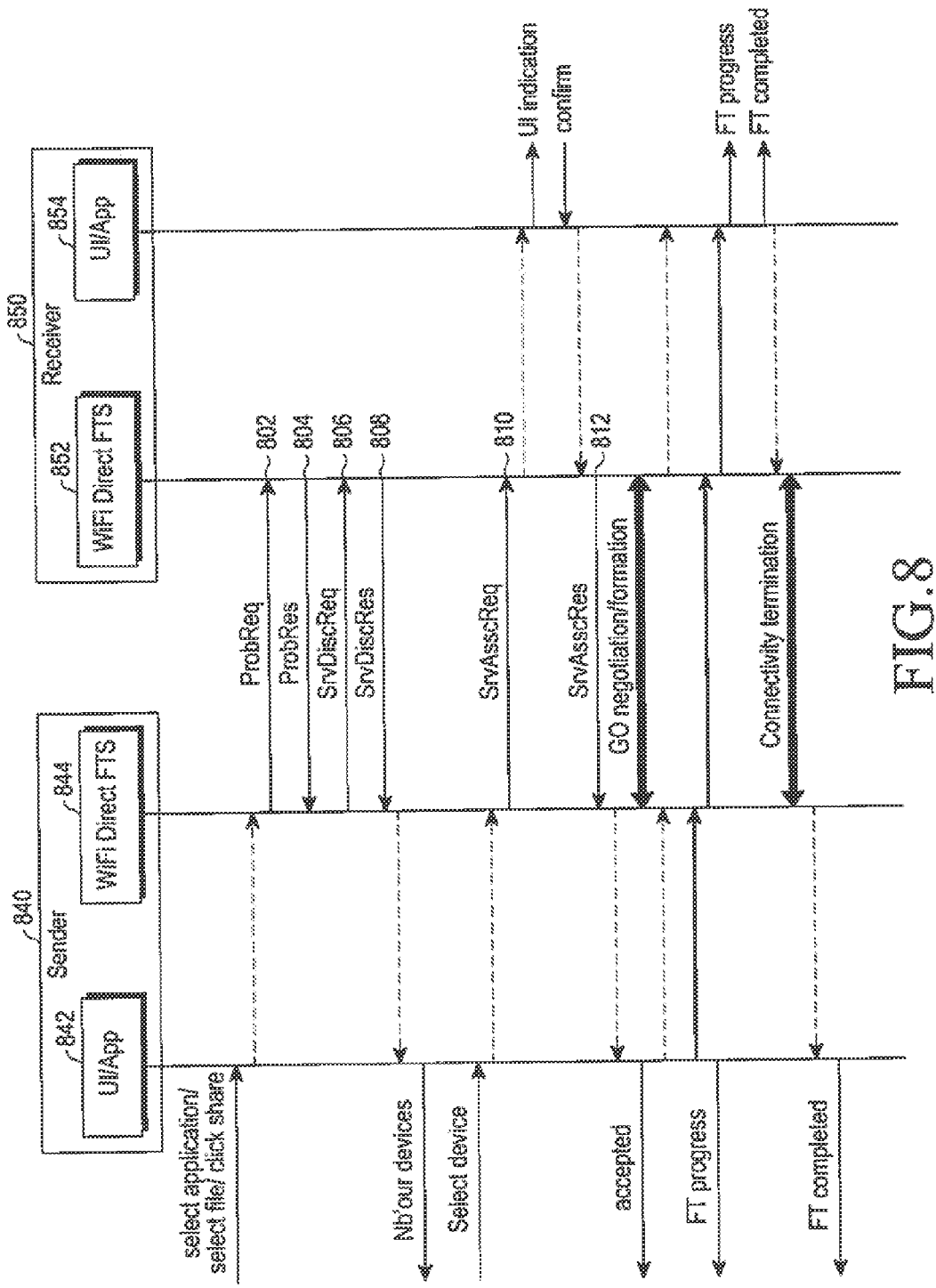
FIGS. 8 through 21 illustrate operation flowcharts for group generation according to another embodiment of the present disclosure.

FIG. 8 is a flowchart illustrating a normal case for group generation according to an embodiment of the present disclosure.

Since operations 802 and 804 are identical to operation 706 of FIG. 7 and operations 806 and 808 are identical to operations 710 and 712, a detailed description thereof will not be provided. Operations 810 and 812 are identical to operations 718 and 724 of FIG. 7 and thus will not be described in detail.

FIG. 8 is the same as FIG. 7, in which a sender 840 may include a User Interface (UI)/application (App) 842 and a WiFi Direct File Transfer Service (FTS) 844, and a receiver 850 may include a WiFi Direct FTS 952 and an UI/application (App) 954.

The UI/App 842 and the UI/App 854 mean applications for a WiFi Direct service.

Figure 9:
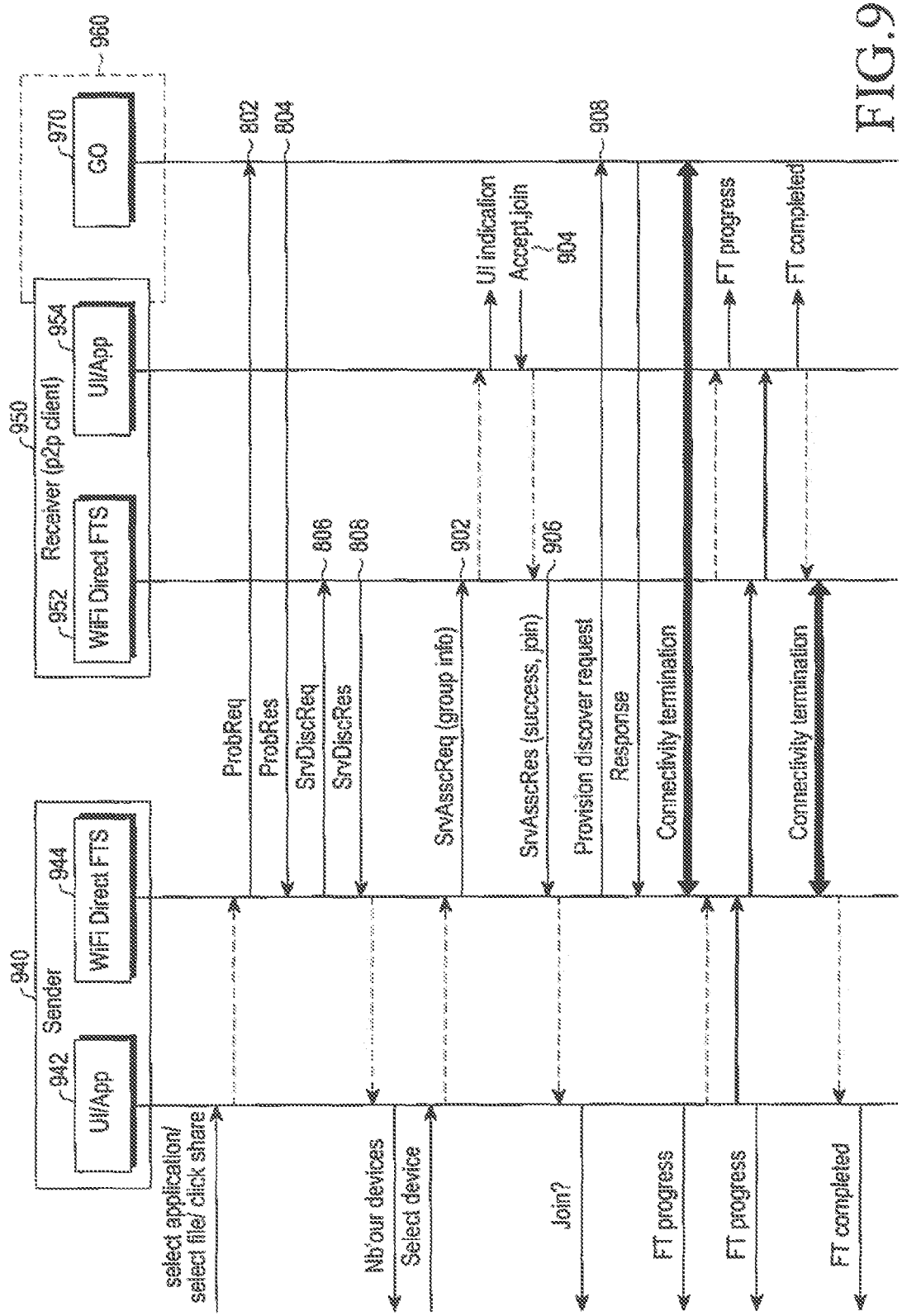

FIG. 9 is a flowchart illustrating a method for generating a group according to another embodiment of the present disclosure.

A sender 940 may include an UI/App 942 and a WiFi Direct FTS 944, and a receiver 950 may include a WiFi Direct FTS 952 and an UI/App 954.

In FIG. 9, the receiver 950 has already formed a group 960 with another device 970 (for example, a GO in an already formed group).

Operations 802 through 808 of FIG. 9 are the same as operations 802 through 808 of FIG. 8, and thus a detailed description thereof will not be provided.

In operation 902, the sender 940 sends a Service Association Request including Group information according to an embodiment of the present disclosure to the receiver 950. Once accepting the join of the sender 940 in operation 904, the receiver 950 sends a Service Association Response to the sender 940. The Service Association Response may include a meaning of acceptance of join in an already formed group.

The sender 940 sends a P2P Provision Discovery Request to the GO 970 in operation 908 and receives a response to the P2P Provision Discovery Request, thus forming a group.

Figure 10:
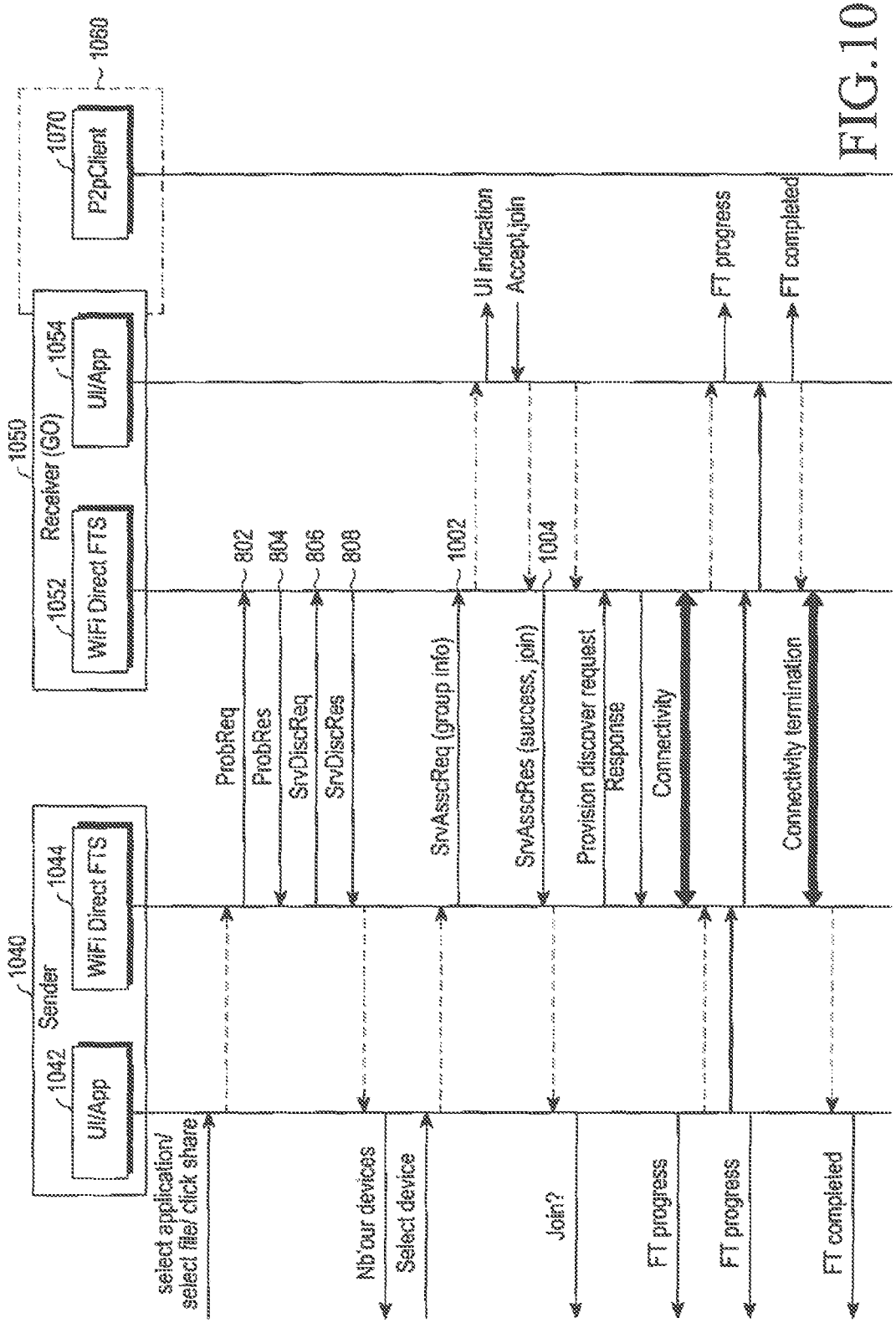

FIG. 10 is a flowchart illustrating a method for generating a group according to another embodiment of the present disclosure.

A sender 1040 may include an UI/App 1042 and a WiFi Direct FTS 1044, and a receiver 1050 may include a WiFi Direct FTS 1052 and an UI/App 1054.

In FIG. 10, the receiver 1050 has already formed a group 1060 with another device 1070 (for example, a P2P client in an already formed group).

Operations 802 through 808 of FIG. 10 are identical to operations 802 through 808 of FIG. 8, and thus a detailed description will not be provided. The other procedures are also the same as those of FIGS. 9 and 10.

Figure 11:
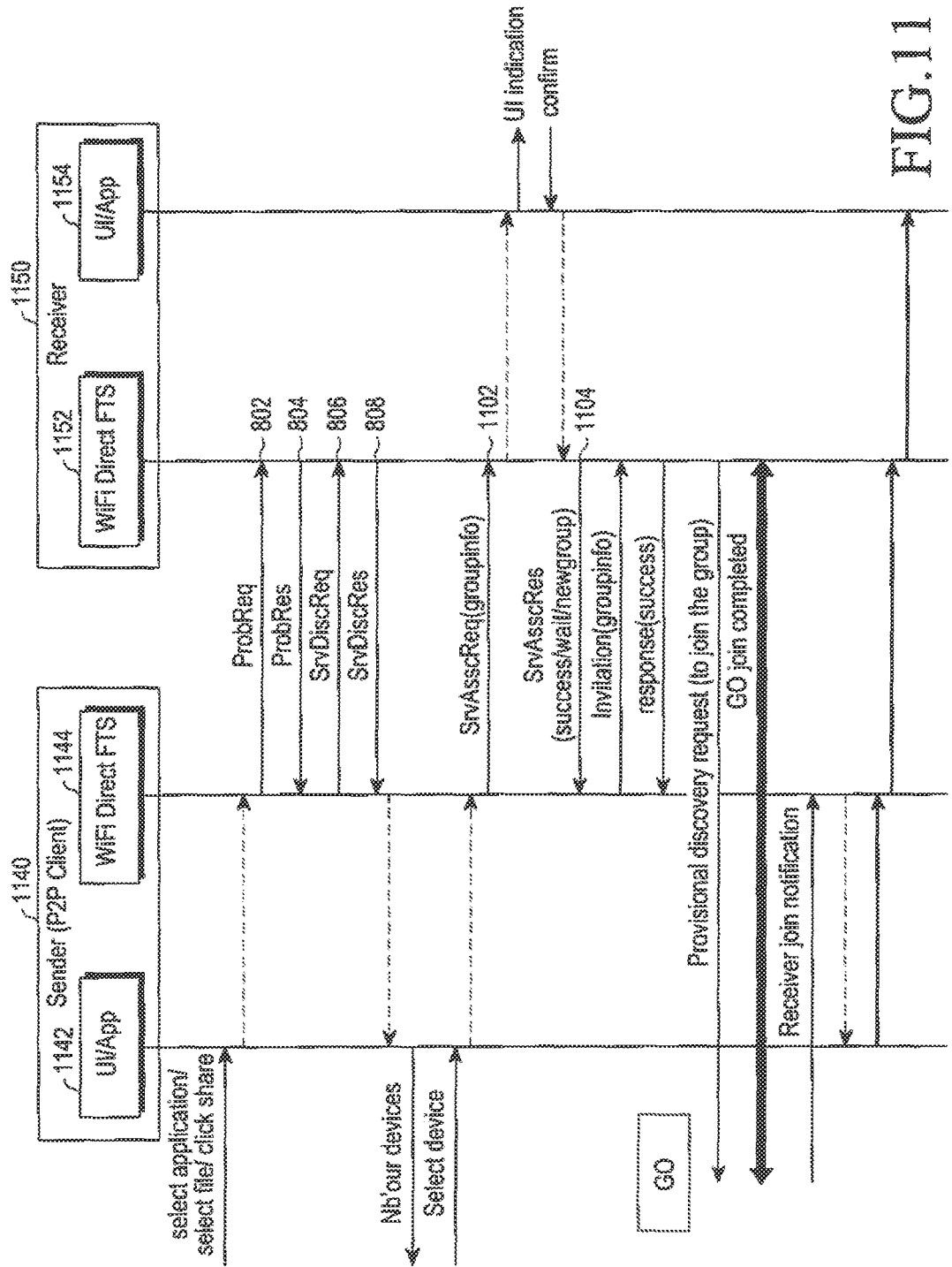
Figure 12:
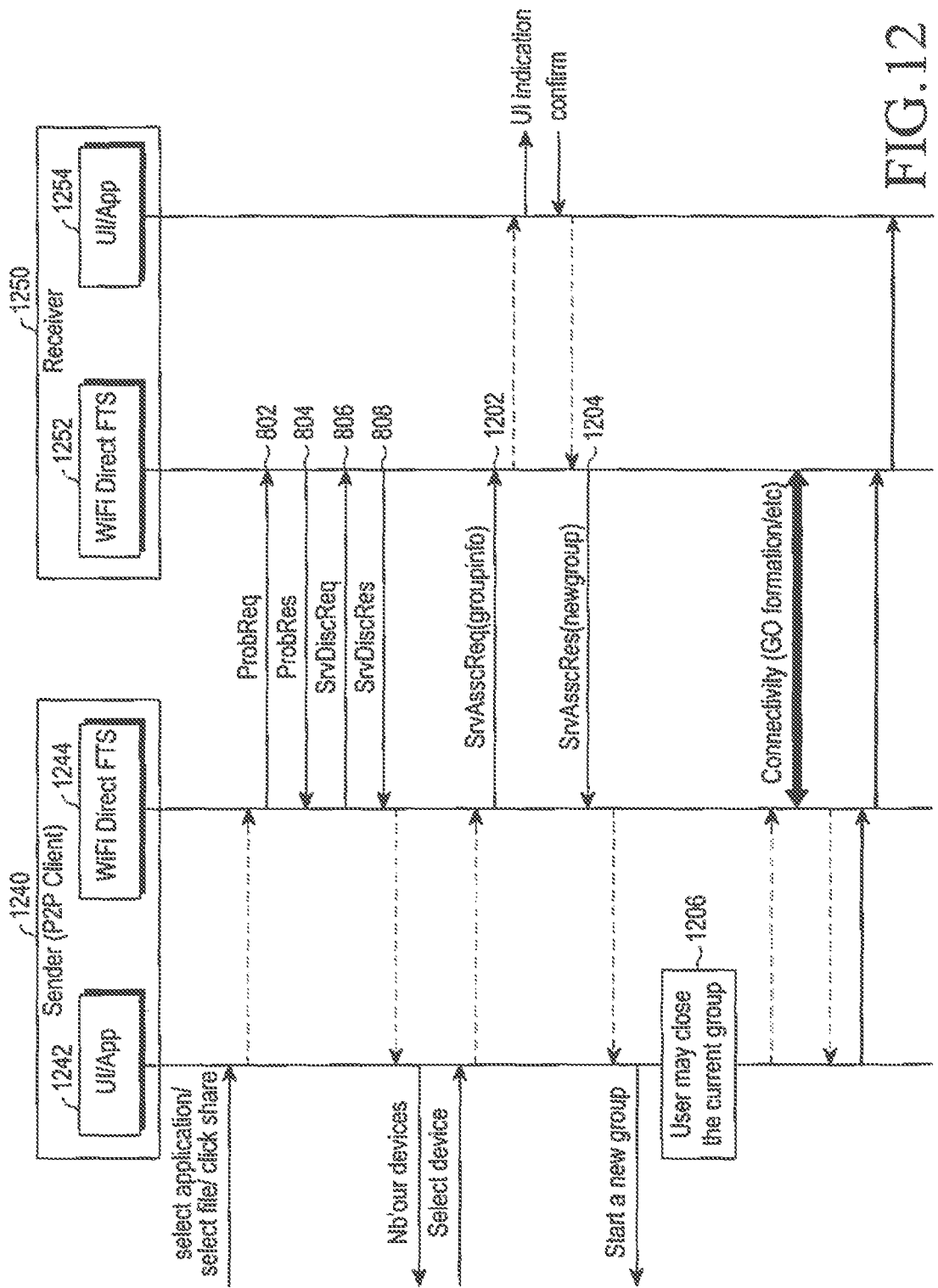

FIG. 11 illustrates a case where a sender according to another embodiment of the present disclosure is a P2P client 1, and FIG. 12 illustrates a case where a sender according to another embodiment of the present disclosure is a P2P client 2. In FIGS. 11 and 12, in operation 1102, a Service Association Request may include Group information according to an embodiment of the present disclosure.

Figure 13:
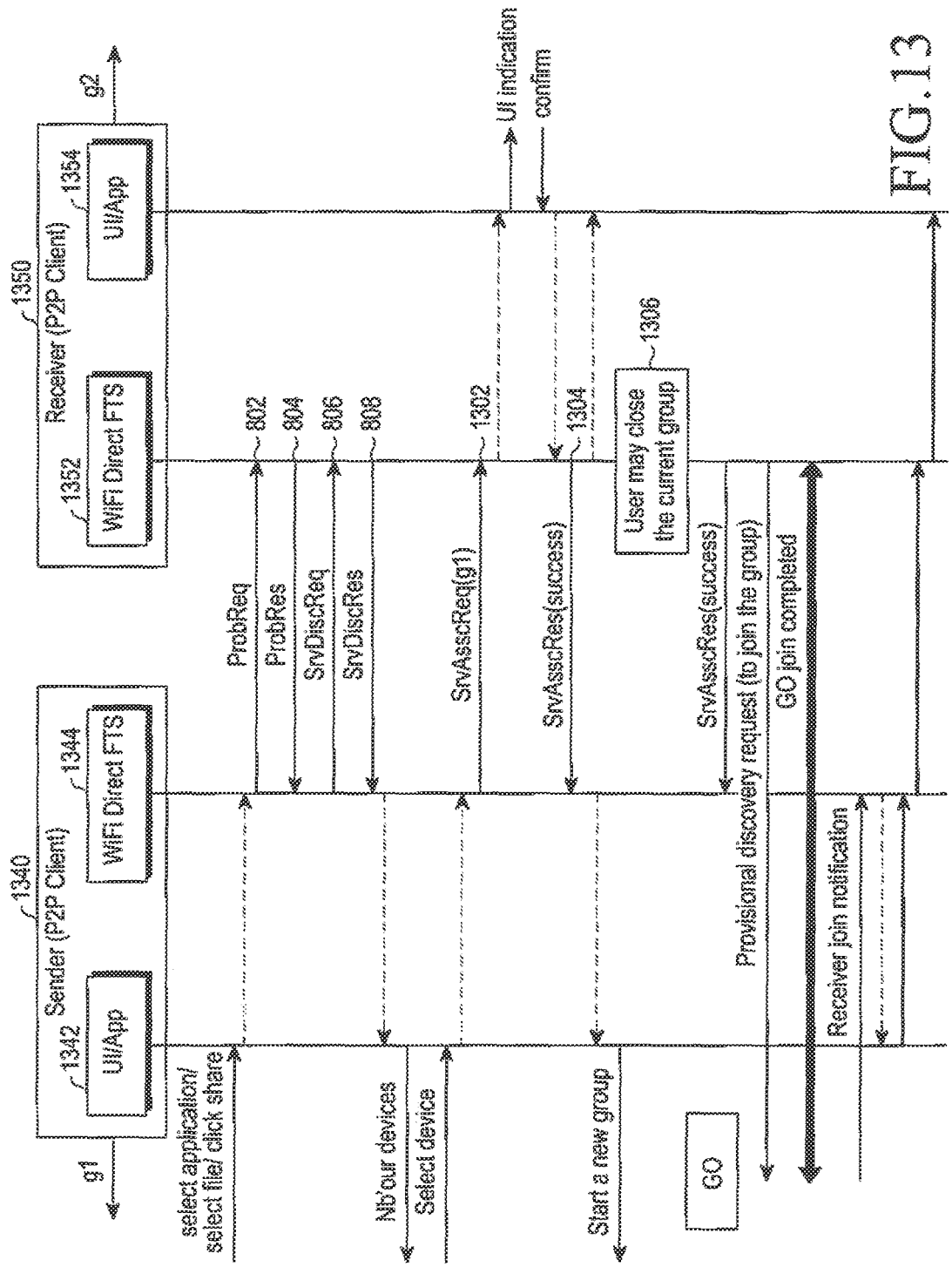
Figure 14:
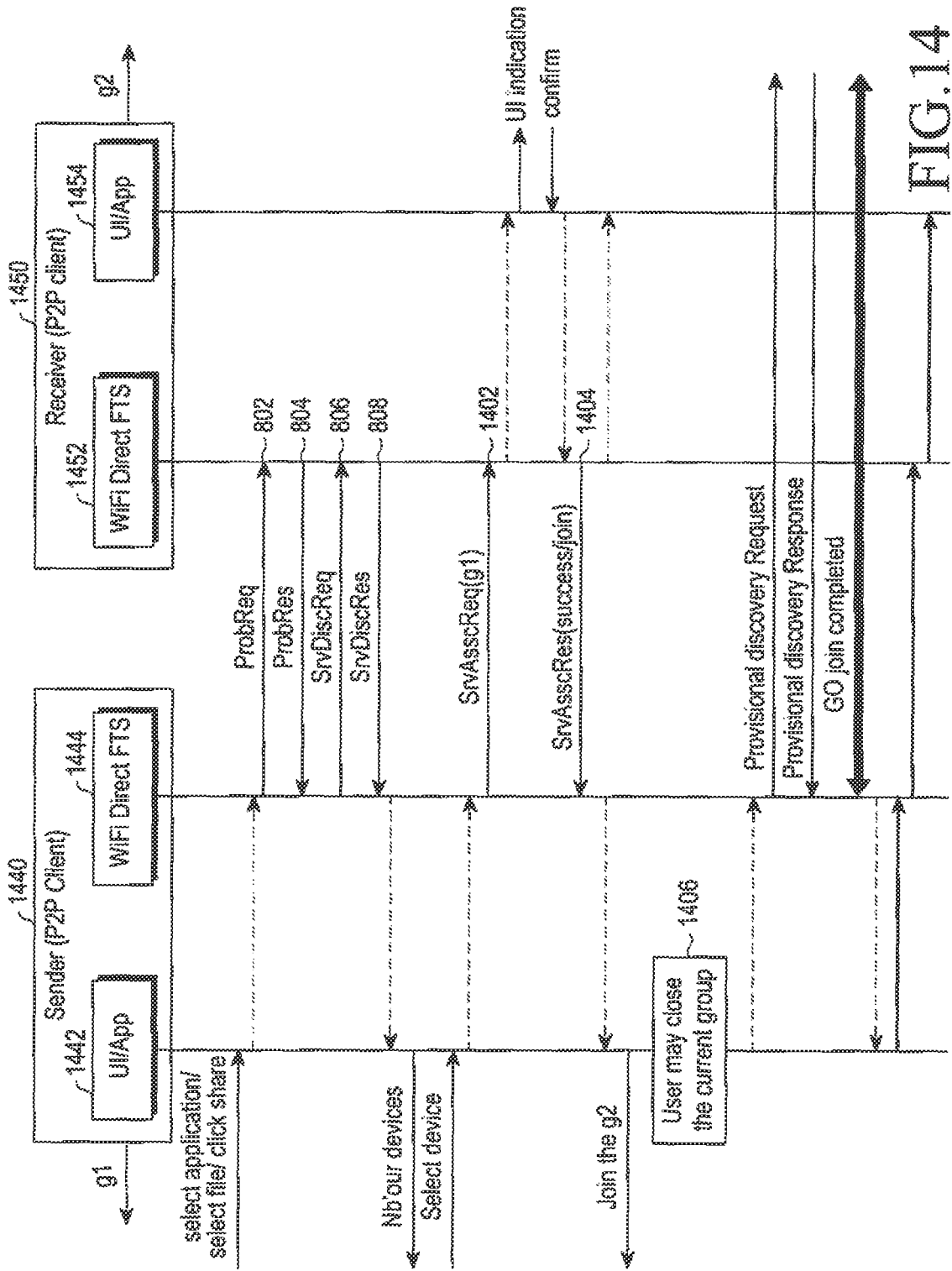

FIGS. 13 and 14 illustrate a case where a sender is a P2P client 1 in a group 1 and a receiver is a P2P client 2 in a group 2.

Figure 15:
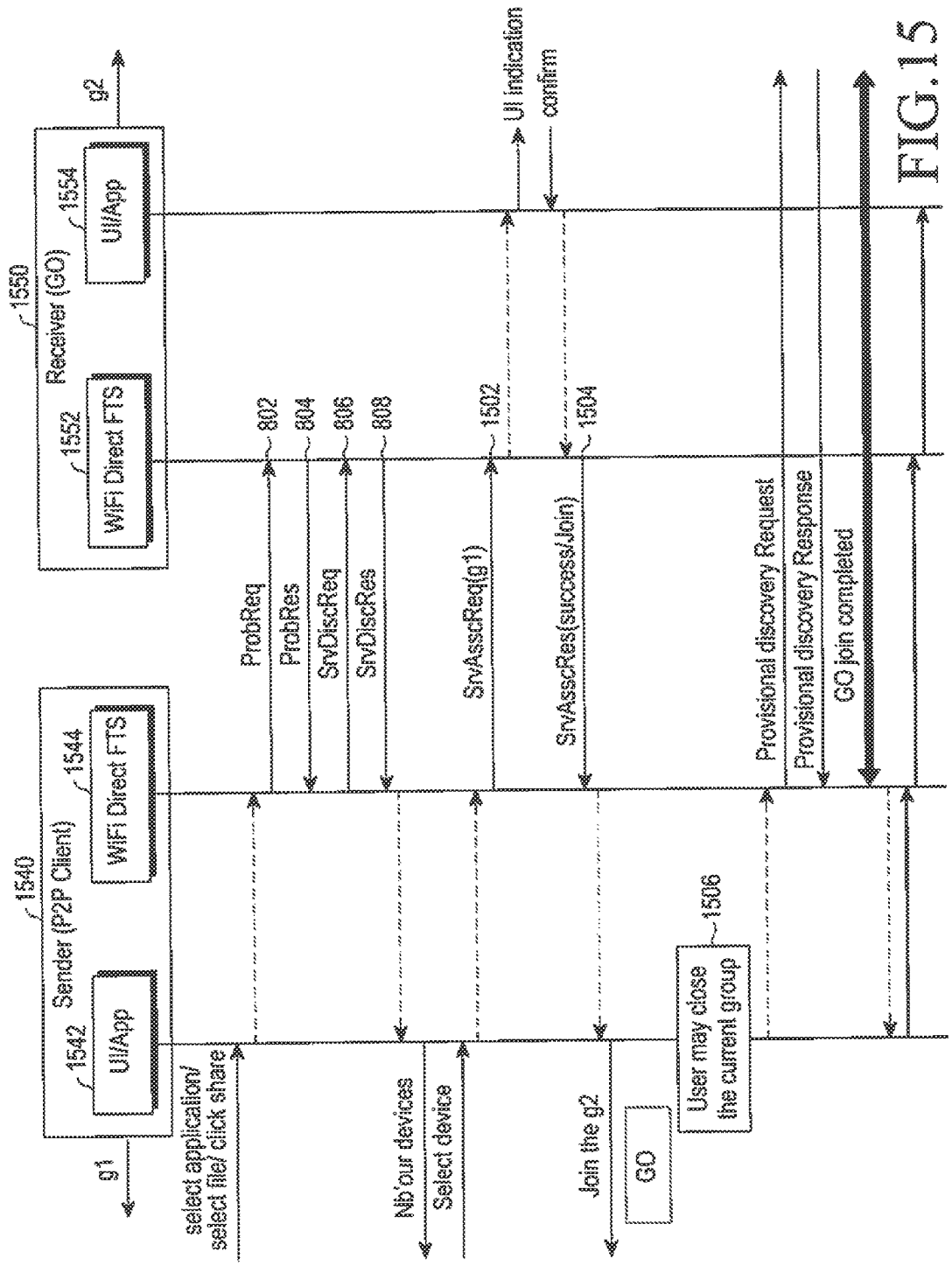
Figure 16:
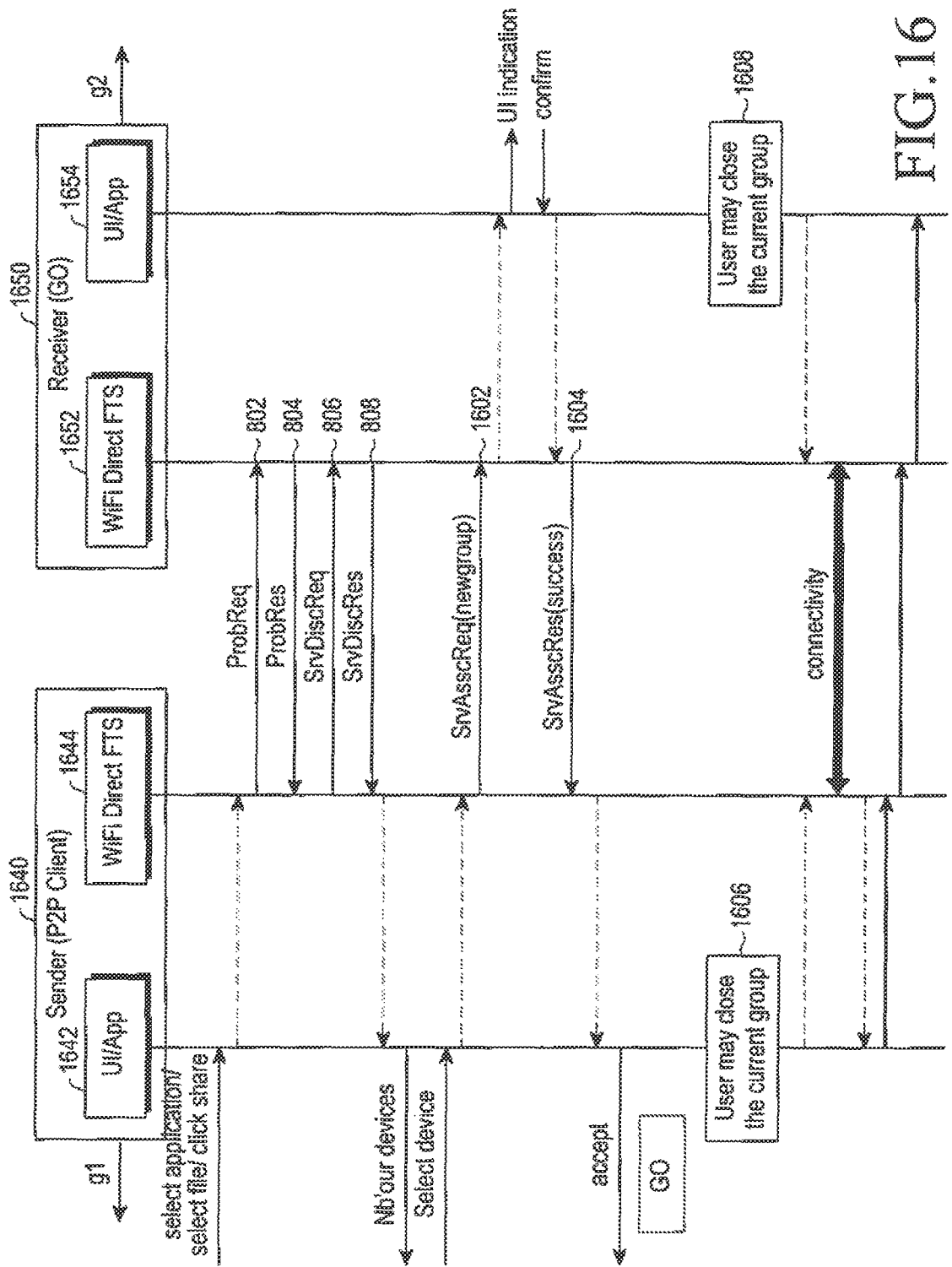

FIGS. 15 and 16 illustrate a case were a sender is a P2P client 1 in a group 1 and a receiver is a GO in a group 2.

Figure 17:
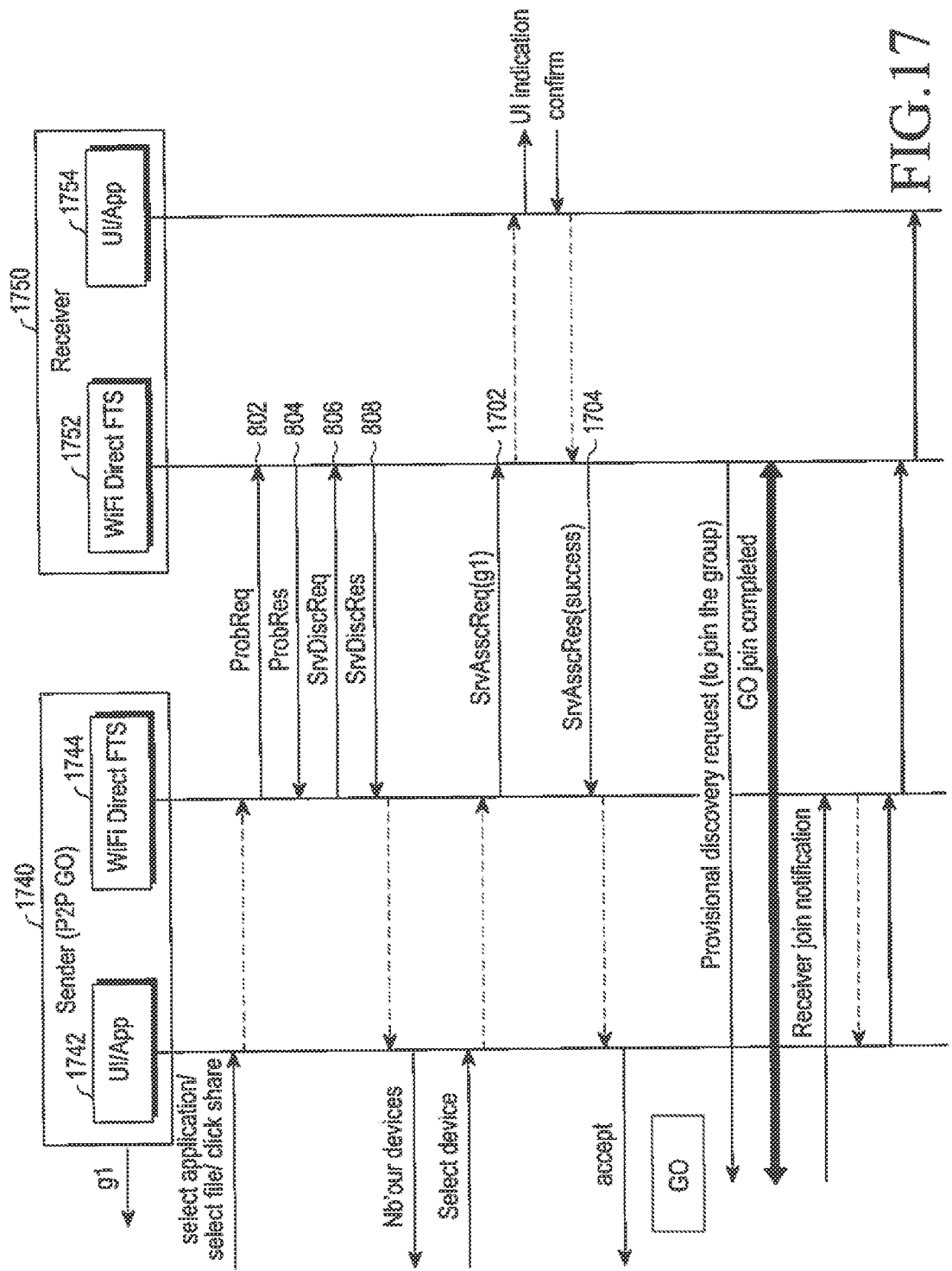
Figure 18:
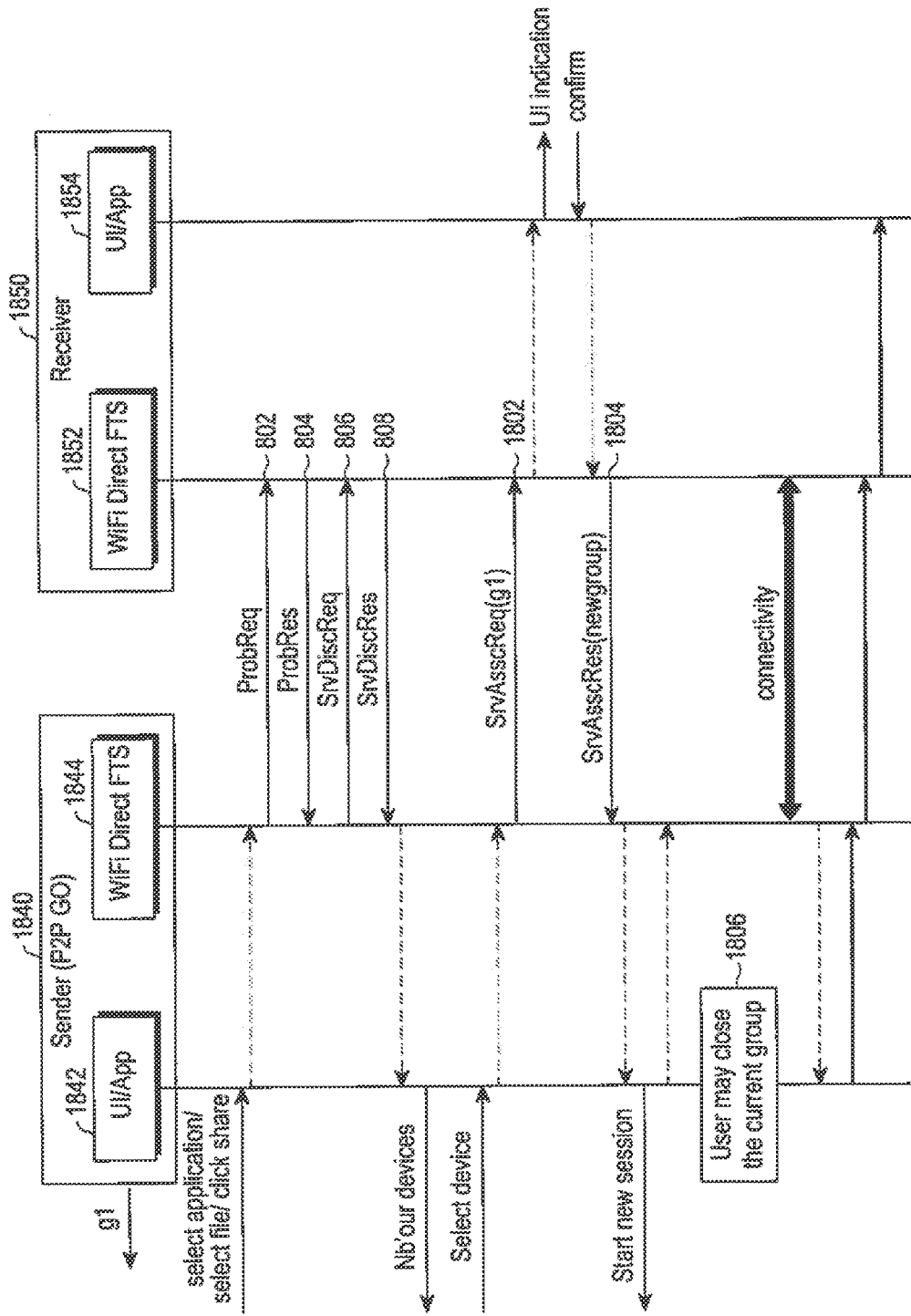

FIGS. 17 and 18 illustrate a case where a sender is a P2P client 1 in a group 1 and a receiver is the receiver of FIG. 8. Sender is in group P2P Client1(g1) and Receiver Case1

Figure 19:
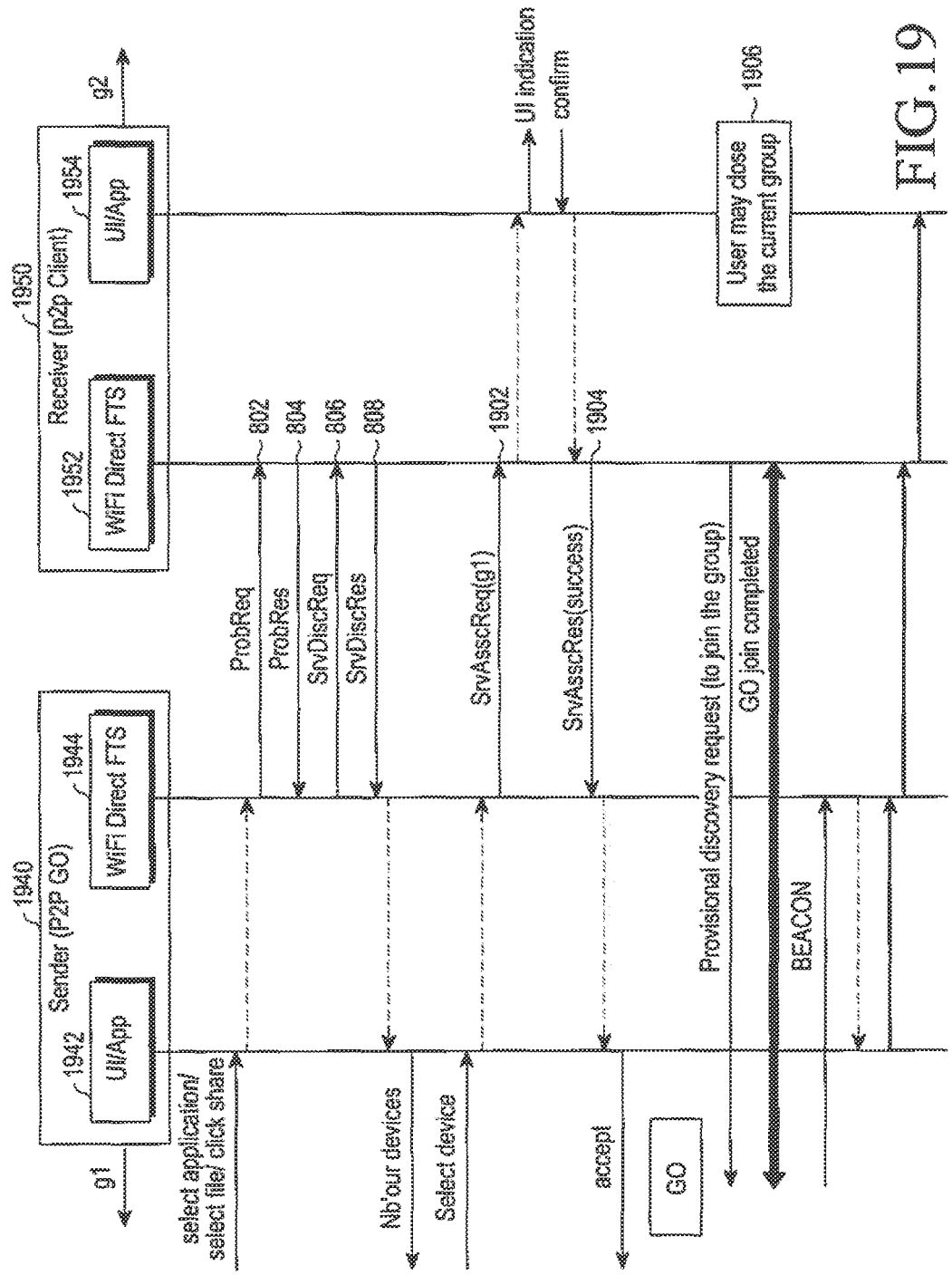

FIG. 19 illustrates a case where a sender is a P2P client 1 in a group 1 and a receiver is a P2P client in a group 2.

Figure 20:
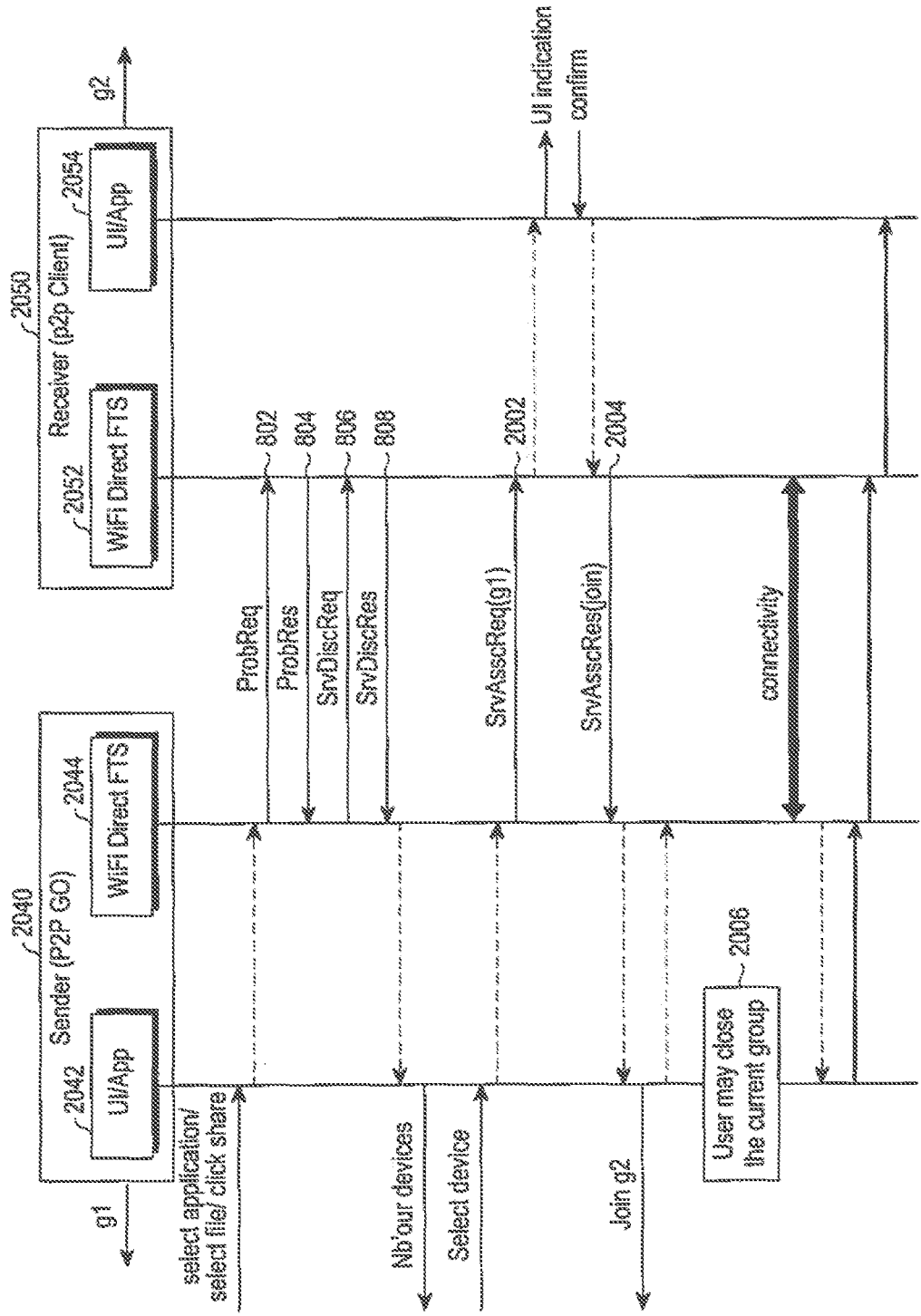
Figure 21:
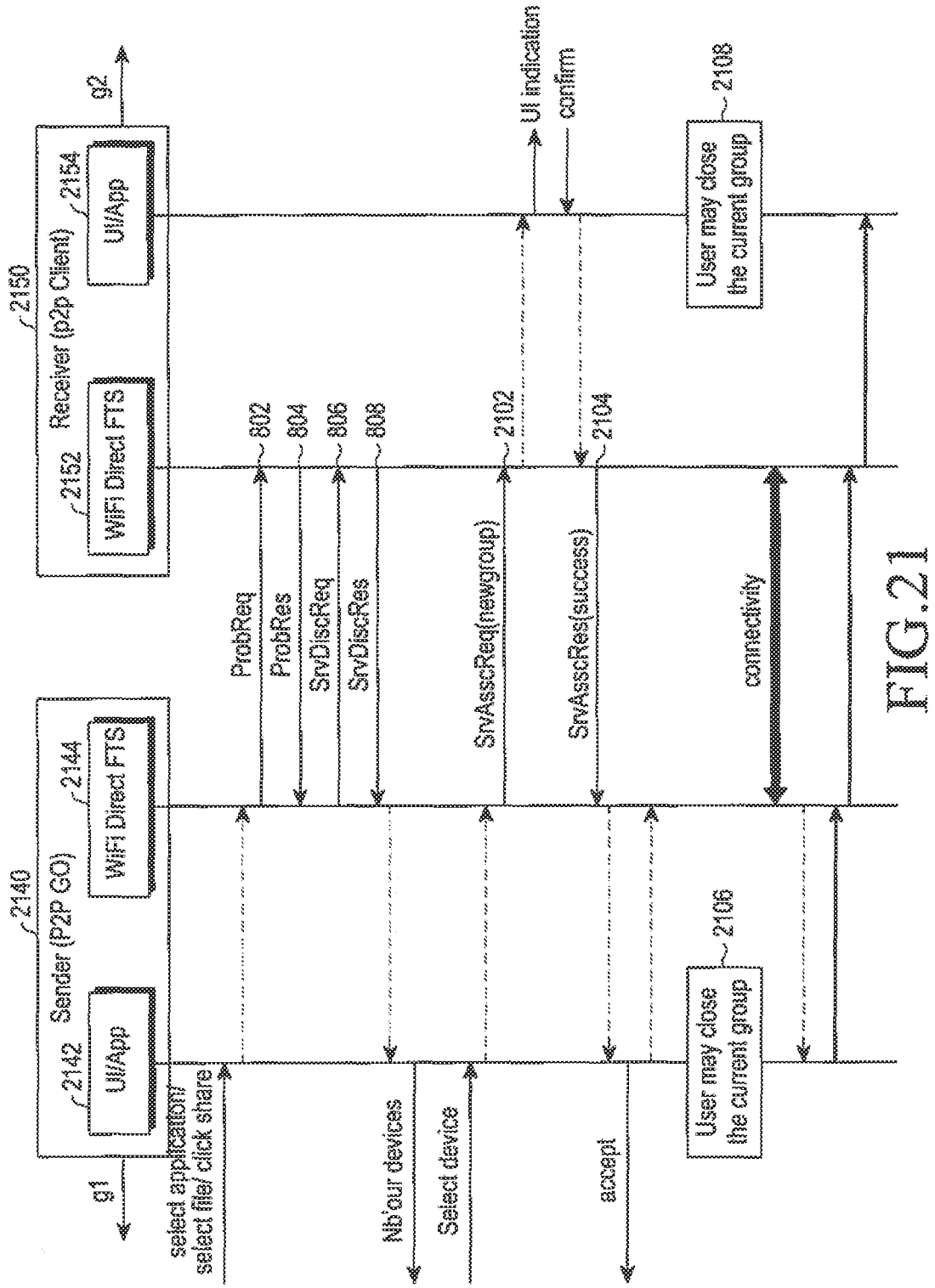

FIG. 20 illustrates a case where a sender is a P2P GO in a group 1 and a receiver is a P2P client in a group 2. FIG. 21 illustrates a case where a sender is a P2P GO in a group 1 and a receiver is a P2P client in a group 2.

Operation 718 of FIG. 7, operation 810 of FIG. 8, operation 902 of FIG. 9, operation 1002 of FIG. 10, operation 1102 of FIG. 11, operation 1202 of FIG. 12, operation 1302 of FIG. 13, operation 1402 of FIG. 14, operation 1502 of FIG. 15, operation 1602 of FIG. 16, operation 1702 of FIG. 17, operation 1802 of FIG. 18, operation 1902 of FIG. 19, operation 2002 of FIG. 20, and operation 2102 of FIG. 21 include connection capabilities, an example of which may be Table 1 or Table 2. The present disclosure may generate an optimal P2P group according to a network state, device capabilities, and a service state.

Even for a device that does not support a concurrent mode, a group may be autonomously generated to provide a service upon termination of an existing session.

Figure 22:
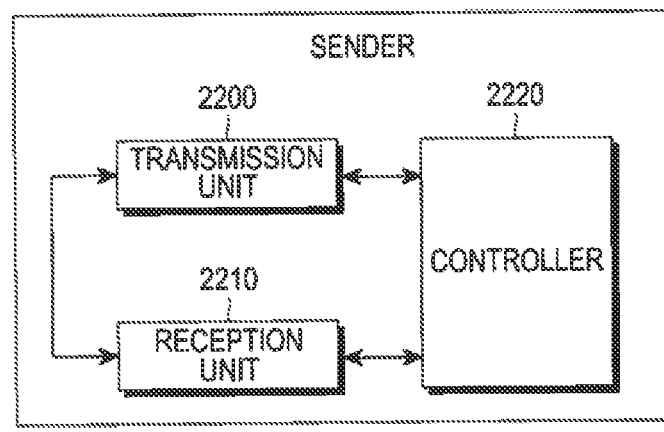
FIG. 22 is a structural diagram illustrating a transmitter according to an embodiment of the present disclosure.

FIG. 22 is a structural diagram of a sender according to an embodiment of the present disclosure.

Referring to FIG. 22, a sender may include a transmission unit 2200, a reception unit 2210, and a controller 2220.

The transmission unit 2200 and the reception unit 2210 may include a transmission module and a reception module for transmitting and receiving data with a receiver according to an embodiment of the present disclosure, respectively, in a communication system.

The controller 2220 performs a terminal discovery process and a service discovery process with the receiver and controls sending a request message including capability to the receiver, receiving a response message to the request message from the receiver, and forming a group with the second device based on negotiated group type information included in the response message.

Figure 23:
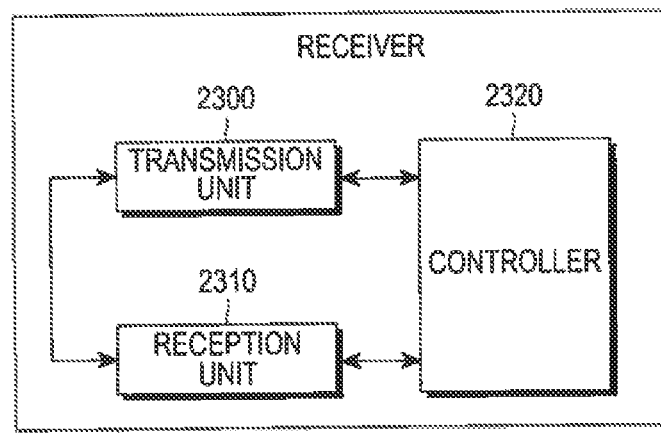
FIG. 23 is a structural diagram illustrating a receiver according to an embodiment of the present disclosure.

FIG. 23 is a structural diagram of a receiver according to an embodiment of the present disclosure.

Referring to FIG. 23, the receiver may include a transmission unit 2300, a reception unit 2310, and a controller 2320. Although not shown, the structural diagram of the receiver may also be applied to a member (another receiver) of a group the receiver joins.

The transmission unit 2300 and the reception unit 2310 may include a transmission module and a reception module for transmitting and receiving data with the sender according to an embodiment of the present disclosure, respectively.

The controller 2320 controls performing a terminal discovery process and a service discovery process with the sender, receiving a request message including capability from the sender, checking the capability included in the request message, determining whether to form a group according to the capability, generating negotiated group type information if the group is formed according to the capability, sending a response message including the negotiated group type information, and forming a group with the sender based on group formation information included in the response message.

The method and apparatus according to an embodiment of the present disclosure can be embodied as code that is readable by a computer on a non-transitory computer-readable recording medium. The computer-readable recording medium includes all kinds of recording devices storing data that is readable by a computer system. Examples of the non-transitory computer-readable recording medium include read-only memory (ROM), random access memory (RAM), CD-ROMs, magnetic tapes, floppy disks, optical data storage devices, and carrier waves such as transmission over the Internet.

Since various substitutions, changes, and modifications may be made by those of ordinary skill in the art without departing the technical spirit of the present disclosure, the above-described present disclosure is not limited by the foregoing embodiment and drawings.

The invention claimed is:

1. A method of forming a peer-to-peer (P2P) group with a second device by a first device, the method comprising:

discovering, by the first device, the second device by performing a device discovery operation;

performing a service discovery operation with the second device;

transmitting a request message for requesting first connection capability information of the second device to the second device;

receiving a response message to the request message from the second device; and forming the P2P group with the second device based on the first connection capability information included in the response message, wherein the first connection capability information comprises one of a first value meaning that group owner negotiation will be used to determine a new group owner, a second value meaning that the second device will join an existing group of the first device or an autonomously-formed group on the first device, and a third value meaning that the first device should join an existing group of the second device or an autonomously-formed group on the second device, wherein the request message comprises a P2P group identifier (ID) for specifying the existing group of the first device or the autonomously-formed group on the first device, and wherein the response message comprises a P2P group ID for specifying the existing group of the second device or the autonomously-formed group on the second device.

2. The method of claim 1, wherein the request message comprises second connection capability information of the first device.

3. The method of claim 2, wherein the second connection capability information comprises at least one of a fourth value meaning that the first device can become a group owner of a new group or become a client, a fifth value meaning that the first device can join a group, and a sixth value meaning that the first device is a group owner of an existing group.

4. A first device for forming a peer-to-peer (P2P) group with a second device, the first device comprising:

a transmitter;

a receiver; and a controller configured to discover the second device by performing a discovery operation, perform a service discovery operation with the second device, control the transmitter for transmitting a request message for requesting first connection capability information of the second device to the second device, control the receiver for receiving a response message to the request message from the second device, and forming the P2P group with the second device based on the first connection capability information included in the response message, wherein the first connection capability information comprises one of a first value meaning that group owner negotiation will be used to determine a new group owner, a second value meaning that the second device will join an existing group of the first device or an autonomously-formed group on the first device, and a third value meaning that the first device should join an existing group of the second device or an autonomously-formed group on the second device, wherein the request message comprises a P2P group identifier (ID) for specifying the existing group of the first device or the autonomously-formed group on the first device, and wherein the response message comprises a P2P group ID for specifying the existing group of the second device or the autonomously-formed group on the second device.

5. The first device of claim 4, wherein the request message comprises second connection capability information of the first device.

6. The first device of claim 5, wherein the second connection capability information comprises at least one of a fourth value meaning that the first device can become a group owner of a new group or become a client, a fifth value meaning that the first device can join a group, and a sixth value meaning that the first device is a group owner of an existing group.

7. A method of forming a peer-to-peer (P2P) group with a first device by a second device, the method comprising:
discovering, by the second device, the first device by performing a device discovery operation;
performing a service discovery operation with the first device;
receiving a request message for requesting first connection capability information of the second device from the first device;
transmitting to the first device a response message including the first connection capability information; and
forming the P2P group with the first device based on first connection capability information,
wherein the first connection capability information comprises one of a first value meaning that group owner negotiation will be used to determine a new group owner, a second value meaning that the second device will join an existing group of the first device or an autonomously-formed group on the first device, and a third value meaning that the first device should join an existing group of the second device or an autonomously-formed group on the second device,
wherein the request message comprises a P2P group identifier (ID) for specifying the existing group of the first device or the autonomously-formed group on the first device, and
wherein the response message comprises a P2P group ID for specifying the existing group of the second device or the autonomously-formed group on the second device.

8. The method of claim 7, wherein the request message comprises second connection capability information of the first device.

9. The method of claim 8, wherein the second connection capability information comprises at least one of a fourth value meaning that the first device can become a group owner of a new group or become a client, a fifth value meaning that the first device can join a group, and a sixth value meaning that the first device is a group owner of an existing group.

10. A second device for forming a peer-to-peer (P2P) group with a first device, the second device comprising:
a transmitter;
a receiver; and
a controller configured to discover the first device by performing a device discovery operation, perform a service discovery operation with the first device, control the receiver for receiving a request message for requesting first connection capability information of the second device from the first device, control the transmitter for transmitting to the first device a response message including the first connection capability information of the second device, and form the P2P group with the first device based on first connection capability information,
wherein the first connection capability information comprises one of a first value meaning that group owner negotiation will be used to determine a new group owner, a second value meaning that the second device will join an existing group of the first device or an autonomously-formed group on the first device, and a third value meaning that the first device should join an existing group of the second device or an autonomously-formed group on the second device,
wherein the request message comprises a P2P group identifier (ID) for specifying the existing group of the first device or the autonomously-formed group on the first device, and
wherein the response message comprises a P2P group ID for specifying the existing group of the second device or the autonomously-formed group on the second device.

11. The second device of claim 10, wherein the request message comprises second connection capability information of the first device.

12. The second device of claim 11, wherein the second connection capability information comprises at least one of a fourth value meaning that the first device can become a group owner of a new group or become a client, a fifth value meaning that the first device can join a group, and a sixth value meaning that the first device is a group owner of an existing group.

* * * * *